United States Patent [19]
Ono et al.

[11] 3,810,226
[45] May 7, 1974

[54] DEVICE FOR CONTROLLING SHUTTER EXPOSURE TIME

[75] Inventors: Shigeo Ono, Yokohama; Ichiro Hamaguchi, Tokyo, both of Japan

[73] Assignee: Nippon Kogaku K.K., Tokyo, Japan

[22] Filed: July 26, 1973

[21] Appl. No.: 382,648

Related U.S. Application Data

[63] Continuation of Ser. No. 229,127, Feb. 24, 1972, abandoned.

[52] U.S. Cl. .............................................. 354/51
[51] Int. Cl. ............................................. G03b 7/08
[58] Field of Search .................................. 95/10 CT

[56] References Cited
UNITED STATES PATENTS

| 3,641,890 | 2/1972 | Ono ............................. | 95/10 CT |
| 3,648,580 | 3/1972 | Yanagi ......................... | 95/10 CT |
| 3,429,242 | 2/1969 | Yoshida et al. ............... | 95/10 CT |
| 3,474,713 | 10/1969 | Mori et al. ................... | 95/10 CT |

*Primary Examiner*—Samuel S. Matthews
*Assistant Examiner*—Michael L. Gellner
*Attorney, Agent, or Firm*—Fitzpatrick, Cella, Harper & Scinto

[57] ABSTRACT

A device for controlling shutter exposure time in an automatic exposure camera includes a storage circuit having a power source, a first switch, a photoconductive element with its resistance variable in accordance with the intensity of light from an object, diodes or resistors serially connected with the photoconductive element and parallel-connected with the power source through the first switch for dividing the voltage of the power source, a capacitor having one of the terminals thereof connected with a point of connection between the photoconductive element and the diodes or resistors for storing a voltage determined by the resistance value of the photoconductive element, a second switch serially connected between the said one terminal of the capacitor and said point of connection so that it is opened before operation of the camera's shutter, and a circuit for controlling the shutter exposure time in accordance with the voltage stored in the capacitor, characterized in that the other terminal of the capacitor remains connected with the power source as long as the second switch is closed.

6 Claims, 3 Drawing Figures

DEVICE FOR CONTROLLING SHUTTER EXPOSURE TIME

This is a continuation of application Ser. No. 229,127, filed Feb. 24, 1972, now abandoned.

BACKGROUND OF THE INVENTION

1. Field of the Invention

This invention relates to shutter control devices for cameras, and more particularly, to a device for controlling shutter exposure time in an automatic exposure camera.

2. Description of the Prior Art

There is known a type of camera in which the intensity of light passed through its photo-taking lens is converted to an electrical charge and stores in such form so as automatically to control the exposure time of the camera's shutter in accordance with the value of the stored charge.

One of the useful means for such storage is a capacitor because it is simple and can vary the stores charge in a stepless manner. The shutter's exposure time is controlled by the voltage resulting from the charge stores in the capacitor in accordance with the intensity of light passed through the photo-taking lens.

However, there are problems associated with the use of a compact electrolytic capacitor convenient for incorporation into a camera. For example, a voltage-drop in the voltage stored while a long exposure time is being controlled is not uncommon because such capacitors tend to leak a relatively great deal of current; and a film capacitor whose leakage current is small is too large and bulky to be contained in a camera.

SUMMARY OF THE INVENTION

Accordingly, the present invention contributes a solution to the problems described above and provides an improved device for controlling shutter exposure time in an automatic exposure camera. According to the present invention, the device comprises a power source, a first switch, a photoconductive element varying its resistance value in accordance with the intensity of light from an object, elements such as diodes or resistors serially connected with the photoconductive element for dividing the voltage of the power source. The elements such as diodes or resistors and the photoconductive element are parallel-connected with the power source through the first switch. A capacitor is provided for storing a voltage determined by the resistance value of the photoconductive element. One of the terminals of the capacitor is connected with a point of connection between the photoconductive element and the elements such as diodes or resistors. A second switch is serially connected between said one terminal of the capacitor and said point of connection so that it is opened before the shutter of the camera is operated. A circuit for controlling shutter exposure time in accordance with the voltage stored in the capacitor is connected with the point of connection between the capacitor and the second switch. The other terminal of the capacitor remains connected with the power source to connect the capacitor with the power source as long as the second switch is closed.

BRIEF DESCRIPTION OF THE DRAWINGS

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended thereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein.

DESCRIPTION OF THE PREFERRED EMBODIMENTS

Figure 1:
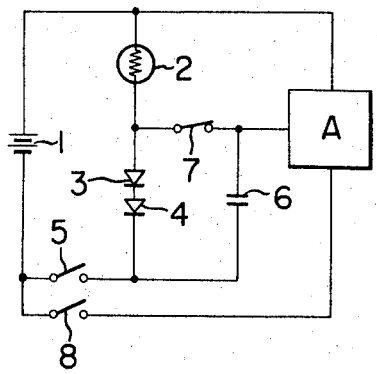
FIG. 1 is a diagram of the circuit of a known device for controlling shutter exposure time.

Referring to FIG. 1, the conventional storage circuit includes a power source such as battery 1, a photoconductive element 2 and diodes 3 and 4 serially connected with one another and parallel-connected with the battery 1 through a switch 5. The diodes 3 and 4 may be replaced by resistors. In case of a single-lens reflex camera, for example, the photoconductive element 2 is retractively positioned, either on the opposite sides of an ocular as viewed from behind a pentaprism, or just in front of the surface of a film so that the element 2 may be illuminated by light passed through a photo-taking lens.

When the switch 5 is closed, a current will flow from the battery 1 to the photoconductive element 2 and diodes 3, 4 and at the terminals of these diodes there will occur a voltage proportional to the logarithm of the intensity of light impinging on the photoconductive element 2. A storage or memory capacitor 6 is parallel-connected with the diodes 3, 4 through a normally closed switch 7 adapted to open just before the light to the photoconductive element 2 is intercepted by operation of a shutter. The storage capacitor 6 is charged to the same voltage level as the terminal voltage of the diodes 3, 4. The point of connection between the storage capacitor 6 and the switch 7 is connected with a magnet driving circuit A including a magnet for preventing the closing action of the shutter and adapted to control exposure time in accordance with the magnitude of the voltage stored in the storage capacitor 6.

A further switch 8 is provided to supply therethrough power from the power source 1 to the magnet driving circuit A.

It is assumed that the input current to the magnet driving circuit A is zero and that the variation in the voltage stored in the capacitor 6 is 36mv each time the light source becomes twice as large and the capacitor 6 has a capacity of 3.3 uF. In order to control an exposure time of 10 seconds within an error range of 1/5 step, (i.e., $10 \times 2 \pm 1/5 = 8.71, 11.49$ sec.), the leakage current I from the capacitor 6 will be:

$I = 36 \times 10^{-3}/5 \times 3.3 \times 10^{-6}/10 = 0.7$ nA

Capacitors of such small leakage current may be found among film capacitors, but we have not been able to find them among electrolytic capacitors. As noted previously, however, any film capacitor is unsuitable for containment in a camera because of its large size. Therefore, we have studied the leakage current for a tantalum electrolytic capacitor which is compact and has good performance characteristics, and we have found that such electrolytic capacitor tends to show a greatly decreased leakage current where the capacitor is of high voltage resistivity and used at a low charging voltage, and that the decrease in leakage current is proportional to the lapse of time from the point of time at which the voltage is applied to the capacitor. FIG. 4 graphically illustrates the relationship between time and leakage current when a tantalum electrolytic capacitor having a voltage resistivity of 35v is charged with 2v at two ambient temperatures, 60° C and 20° C, respectively.

It is seen from the graph that at either ambient temperature, the described condition for leakage current can be satisfied when 1,000 seconds elapse. In case of the circuit shown in FIG. 1, this means that there must be a time lapse of 1,000 seconds from the point of time at which the switch 5 is closed to the point of time at which the shutter is operated, an impossible condition. It is, therefore, proposed that one of the terminals of the capacitor 6 be directly connected with the negative terminal of the power source 1 in the manner shown in FIG. 2.

Figure 2:
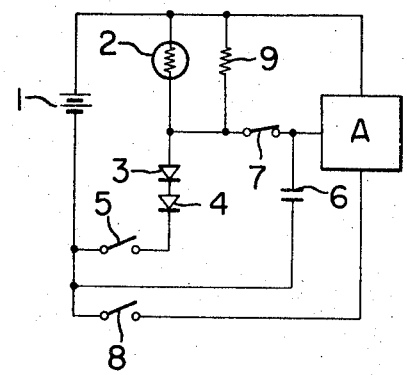
FIG. 2 is a diagram of the circuit of the device according to an embodiment of the present invention.
Figure 3:
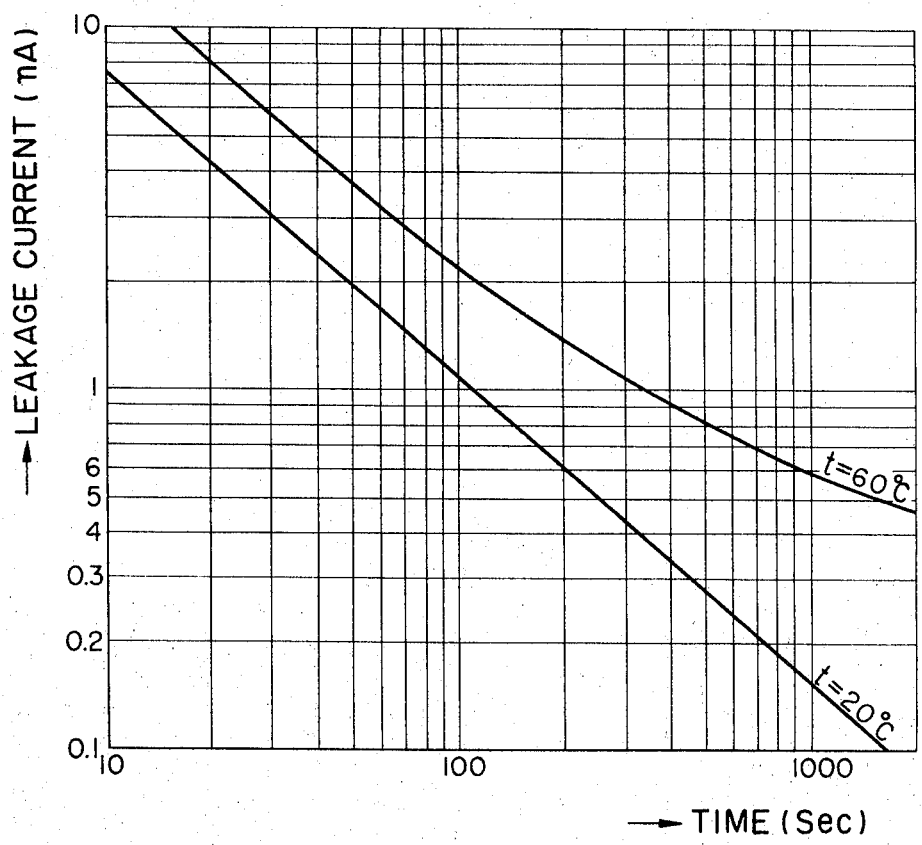
FIG. 3 is a graph illustrating the extent of current leakage of an electrolytic capacitor with the lapse of time from the point of time at which a voltage is applied to the capacitor.

By doing so, in FIG. 2, the capacitor 6 may normally be charged through the photoconductive element 2 to the same voltage level as the power source 1, reducing its leakage current to an extremely low magnitude. When the switch 5 is closed to effect measurement of the intensity of light incident on the photoconductive element 2, excessive charges will be discharged through the diodes 3 and 4 so that the voltage across the capacitor 6 will become equal to the voltage divided by the photoconductive element 2 and diodes 3, 4. If the shutter release button (not shown) is then depressed, the switch 7 will be opened by the action of a shutter releasing member (in case of a single-lens reflex camera, the action of the mirror driving member), so that the capacitor 6 will store a voltage corresponding to the intensity of light which has impinged on the photoconductive element 2 just prior to the opening of the switch 7, thereby maintaining a condition independent of the intensity of light existing after the switch 7 has been opened. Of course, the interception of the incident light onto the photoconductive element 2 takes place after the switch 7 has been opened.

Continued action of the shutter releasing member closes the switch 8, whereafter the shutter is opened to expose the film to light. After lapse of a time corresponding to the voltage stores in the capacitor 6, the shutter is closed by the action of the magnet driving circuit A to complete the exposure of the film.

Where the camera is placed in the dark, the resistance value of the photoconductive element 2 is likely to increase so greatly that the capacitor 6 cannot be charged. To avoid this, a resistor 9 of great resistance value may be parallel-connected with the photoconductive element 6. When in the dark, the capacitor 6 is supplied with power through the resistor 9.

As will be appreciated from the foregoing, the present invention enables a compact and inexpensive tantalum electrolytic capacitor to be used with the leakage current thereof reduced to a very low magnitude, which, in turn, leads to an economical advantage as well as the possibility of such capacitor being contained in a camera.

We believe that the construction and operation of our novel shutter control will now be understood, and that its advantages will be fully appreciated by those persons skilled in the art.

What is claimed is:

1. A device for controlling shutter exposure time in an automatic exposure camera comprising:
    a power source (1);
    a light intensity measuring circuit (2, 3, 4) for measuring light passing from an object to be photographed through the objective of the camera, said light intensity measuring circuit generating an output voltage responsive to an intensity of said light at its output terminal;
    a tantalum electrolytic capacitor (6) for storing said output voltage from said output terminal of said light intensity measuring circuit, one terminal of said capacitor being connected to one terminal of said power source;
    a first switch (7) for connecting the other terminal of said capacitor to said output terminal of said light intensity measuring circuit during closure of said first switch,
    said first switch being adapted to open before the shutter of the camera is opened;
    a second switch (5) connected in series between said one terminal of said power source and a point of junction between said first switch and said output terminal of said light intensity measuring circuit for coupling said measuring circuit to said power source,
    whereby said capacitor is being charged by said power source during the closure of said first switch irrespectively of said second switch; and a control circuit (A) connected to said capacitor for controlling the shutter exposure time in accordance with the voltage stored in said capacitor.

2. A device according to claim 1, wherein said light intensity measuring circuit includes a photoconductive element and an impedance element connected in series with said photoconductive element.

3. A device for controlling shutter exposure time in an automatic exposure camera comprising:
    a power source (1);
    a light intensity measuring circuit including a photoconductive element (2) which receives light passing from an object to be photographed through the objective and an impedance element for dividing the voltage of said power source, one terminal of one of said two elements being connected to one terminal of said source;
    a tantalum electrolytic capacitor (6) for storing a voltage divided by said two elements, one terminal of said capacitor being connected to the other terminal of said source;
    a first switch for connecting the other terminal of said capacitor to the other terminal of said one of said two elements during closure of said first switch, said first switch being adapted to open before the shutter of the camera is operated;

a second switch (5) connected in series with the other one of said two elements between the other terminal of said source and the other terminal of said one of said two elements, whereby said capacitor is being charged by said power source during the closure of said first switch irrespectively of said second switch; and a control circuit connected to said capacitor for controlling the shutter exposure time in accordance with the voltage stored in said capacitor.

4. A device according to claim 3, wherein said impedance element is a diode.

5. A device according to claim 3, wherein said photoconductive element is connected between the other terminal of said power source and said impedance element.

6. A device according to claim 3, further comprising a resistor (9) parallel-connected with said photoconductive element.

* * * * *

UNITED STATES PATENT OFFICE
CERTIFICATE OF CORRECTION

Patent No. 3,810,226                 Dated May 7, 1974

Inventor(s) SHIGEO ONO, ET AL.

It is certified that error appears in the above-identified patent and that said Letters Patent are hereby corrected as shown below:

Title Page, insert: [30] Foreign Application Priority Data

March 3, 1971 Japan . . . 11117/1971

Signed and sealed this 24th day of September 1974.

(SEAL)
Attest:

McCOY M. GIBSON JR.           C. MARSHALL DANN
Attesting Officer              Commissioner of Patents